United States Patent [19]
Kuroiwa

[11] Patent Number: 6,044,050
[45] Date of Patent: Mar. 28, 2000

[54] OPTICAL HEAD TRANSFER CIRCUIT, OPTICAL HEAD AND REPRODUCING APPARATUS INTRODUCING THE SAME CIRCUIT

[75] Inventor: Hitoshi Kuroiwa, Chiba, Japan

[73] Assignee: Sony Corporation, Tokyo, Japan

[21] Appl. No.: 08/940,182

[22] Filed: Sep. 30, 1997

[30] Foreign Application Priority Data

Oct. 4, 1996 [JP] Japan ..................... 8-283234

[51] Int. Cl.[7] ........................................ G11B 7/00
[52] U.S. Cl. ........................ 369/44.41; 369/44.28; 369/44.32
[58] Field of Search .................. 369/44.34, 44.32, 369/44.41, 44.28, 32

[56] References Cited

U.S. PATENT DOCUMENTS

| | | | |
|---|---|---|---|
| 4,998,234 | 3/1991 | Rees et al. | 369/44.41 |
| 5,181,195 | 1/1993 | Kume et al. | 369/44.41 |
| 5,363,358 | 11/1994 | Yanagawa | 369/44.34 |
| 5,568,458 | 10/1996 | Tani et al. | 369/44.34 |
| 5,708,636 | 1/1998 | Takahashi et al. | 369/44.26 |
| 5,875,157 | 2/1999 | Sasaki et al. | 369/44.41 |

FOREIGN PATENT DOCUMENTS

| | | |
|---|---|---|
| 0274420 A1 | 7/1988 | European Pat. Off. . |
| 0363022 A2 | 4/1990 | European Pat. Off. . |
| 0381150 A2 | 8/1990 | European Pat. Off. . |
| 4-2324 | 1/1992 | Japan . |

*Primary Examiner*—Nabil Hindi
*Attorney, Agent, or Firm*—Limbach & Limbach L.L.P.

[57] ABSTRACT

In the optical head transfer circuit of the related art, a sled error signal generated only via a low-pass filter has been used as the tracking error signal. However, the present invention provides a portable type reproducing apparatus which compensates a DC element corresponding to a shifting displacement of an objective lens generated depending on a change of attitude of the reproducing apparatus with a sled feed mechanism, and does not result in deterioration of reproducing characteristics depending on vertical or horizontal installation. The present invention and has realized much improvement in vibration characteristics, because a signal from which the DC element is eliminated corresponding to the shifting displacement of the objective lens is used as the tracking error signal and the sled error signal is generated depending on a signal from which the DC element is not yet eliminated.

11 Claims, 9 Drawing Sheets ns6,044,050

OPTICAL HEAD TRANSFER CIRCUIT, OPTICAL HEAD AND REPRODUCING APPARATUS INTRODUCING THE SAME CIRCUIT

FIELD OF THE INVENTION

The present invention relates to a reproducing apparatus for reproducing a variety of disc type recording media and particularly to a reproducing apparatus of which cabinet attitude is changed in various ways like a portable and mobile reproducing apparatus.

BACKGROUND OF THE INVENTION

As an optical disc recording medium, CD (compact disc) and MD (mini-disc) (these are registered as trademarks) are widely spreading and used in various application fields such as audio, etc.

In a disc reproducing apparatus for reproducing various types of recording media, in order to control the tracking of an optical spot, there are provided a double-axis mechanism for driving an objective lens of an optical head with a tracking error signal obtained from a reflected light beam indicating a track guide information such as pit train and group, etc. and a sled mechanism for displacing the relative position of the optical head as a whole and disc surface in the disc radius direction.

As the sled mechanism, those for moving the optical head as a whole against a disc and for moving a turn-table on which a disc is mounted against the optical head which is fixed to the predetermined position are known. Moreover, as a control system of the sled mechanism, it has been proposed that a sled error signal generated by extraction of a low frequency element with a low-pass filter from the tracking error signal is amplified and is then applied to a sled motor as a sled drive signal. The sled error signal is changed to the signal indicating an offset of an objective lens driven for tracking by the double-axis mechanism of the optical head as a whole and the optical head.

Here, FIG. 1 schematically shows an example of the structure of an optical block of the related art which is installed in an optical head of a reproducing apparatus for a disc such as CD, etc.

In this figure, an optical block of the optical head is composed of a semiconductor laser 81, a collimator lens 82, a deflected beam splitter 83, an objective lens 84 and a photo detector 85. For example, the laser beam radiated from the semiconductor laser 81 is paralleled by the collimator lens 82, and then reflected by the deflected beam splitter 83 to radiate the recording surface of a disc 1 via the objective lens 84.

When the laser beam is focused, the light beam reflected by the pit train provided on the disc 1 passes through the deflected beam splitter 83 and is then supplied to the photo detector 85 to provide the pit information of the disc 1 in the photo detector 85.

FIG. 2 shows the concept of distribution of intensity of the reflected light beam in the relative positional relationship between the pits formed on the disc 1 and spot beam. In the so-called just tracking condition where the pit train of disc 1 is relatively matched with the position of the spot beam, the reflected beam indicated as (a) can be obtained on the photo detector 84. Namely, pit information having an equal intensity distribution in the right and left sides can be obtained on the photo detector 85.

Moreover, if the pit of the disc 1 is relatively displaced in position from the spot beam, for example, when the spot beam position is relatively deviated in the left side from the pit train (de-track condition), the pit information having intensity distribution as shown in (b) can be obtained on the photo detector 85, while when the spot beam position is relatively deviated in the right side from the pit train (de-track condition), the pit information having intensity distribution as shown in (c) can be obtained on the photo detector 85.

Namely, when positions of the pit provided on the disc 1 and spot beam are relatively deviated in the tracking direction, the pit information having different intensity distribution in the right and left sides can be obtained on the photo detector 85.

A difference voltage obtained from intensity distribution difference in the right and left sides of the pit information obtained on the photo detector 85 is supplied to the double-axis mechanism to drive the objective lens 84 as a tracking error signal, a low frequency element of this tracking error signal is extracted to generate a sled error signal and it is then supplied to the sled mechanism for moving the optical head as a whole in order to control the tracking of the optical head to the ON-track condition. A method of detecting such tracking error signal is generally called a push-pull method and a tracking error signal obtained by this push-pull method is called a push-pull error signal in this specification of the present invention.

When, when the tracking of the reproducing apparatus is controlled by the push-pull method shown in FIG. 1, if the objective lens 84 of the optical head is shifted in the lateral direction (tracking direction) indicated by a broken line in FIG. 1 due to the tracking servo operation, etc., the reflected beam obtained on the photo detector 85 is also shifted in the tracking direction as indicated by the broken line.

Therefore, the push-pull error signal generated from the pit information obtained on the photo detector 85 includes, even under the just tracking condition, a DC offset voltage depending on the shift of the objective lens 84, resulting in the problem that this DC offset voltage disables accurate tracking control.

In view of solving such a problem, a detecting method called the top hold push-pull method has been proposed. In this method, the tracking error signal is detected after removing the DC offset voltage for detecting the tracking error signal. Such Top Hold Push-Pull (TPP) method has been disclosed in the Japanese Laid-Open Patent Number HEI 4-23234 presented (filed May 18, 1990) by the same applicant of the present invention. In this case, a DC offset removing circuit for removing a DC offset voltage included in the push-pull error signal is provided to obtain the tracking error signal after having removed the DC offset voltage. Thereby, accurate tracking control can be realized by eliminating influence of the shift operation in the tracking direction of the objective lens 84 of the optical head. In the related art, the sled error signal has been generated by extracting a low frequency element of the tracking error signal obtained by the top hole push-pull method explained above.

In general, since the reproducing apparatus for reproducing a disc such as CD or MD is restricted in installation space, it is expected that the apparatus may be installed vertically or horizontally and is reduced in size. The reproducing apparatus is required, even if it is installed vertically or horizontally, that the optical block in the optical head (at least the objective lens) may be held reliably and an arm forming the double-axis mechanism is never shifted in the tracking direction (horizontal direction) due to its gravity.

Namely, if the reproducing apparatus is installed, for example, vertically, it is just preferable as shown in FIG. 3A that the disc 1 is arranged in vertical, the sled axis 91 of the optical head 90 is arranged in vertical and the arm 85 holding the objective lens 84 of the optical head 90 is arranged to cross diagonally the sled axis 91 so that the position in the tracking direction of the objective lens 84 is never influenced by gravity.

However, in this case, since the sled mechanism for moving the optical head 90 in the radius direction of the disc 1 becomes larger than the external shape of the disc 1 as indicated as the shaded area of FIG. 3A, it has impeded reduction in size of the reproducing apparatus.

Therefore, when the sled mechanism is inclined for arrangement, for example, as shown in FIG. 3B, the sled mechanism can be accommodated in the internal side as much as Δ1 in comparison with FIG. 3A to realize reduction in size of the reproducing apparatus. However, since the sled axis 91 holding the objective lens 84 is also inclined, the arm 85 is deviated with its self weight and the objective lens 84 is shifted in the tracking direction (horizontal direction) under the natural condition where the tracking servo is not effectuated.

In the case where the tracking error signal is obtained by the top push-pull method in the reproducing apparatus in which the sled mechanism is inclined as shown in FIG. 3B, the DC offset voltage indicating the amount of shift due to the gravity of the objective lens 84 can be eliminated. Therefore, as schematically shown in FIG. 4B, the arm 85 holding the objective lens 84 does not return up to the actual mechanical center (hereinafter referred to as mechacenter) and thereby the arm 85 is shifted by its gravity to the external or internal circumference side of the disc 1.

When the optical block 84 as a whole of the optical head 90 is shifted to the external or internal circumference side of the disc 1 as explained above, in regard to the visual field indicated by the peak to peak level of the reproduced RF signal as shown in FIG. 11A and jitter element, the reproduced RF signal will be deteriorated because the peak to peak level of the reproduced RF signal is reduced and jitter element is increased depending on the movement of lens. As a result, when a disc is reproduced using a disc reproducing apparatus, there has been the problems that the vibration proof characteristic which is indicated by an applied vibration frequency showing the limit for not generating track skip may be deteriorated or the S/N ratio of the RF signal is deteriorated to generate noise.

SUMMARY OF THE INVENTION

The present invention has been proposed considering the problems explained above and it is therefore an object of the present invention to provide a reproducing apparatus which can realize reduction in size without deteriorating the vibration proof characteristic and more specifically to provide an optical head transfer circuit, comprising:

a first envelope detector for holding a received light beam output signal from a first light receiving element in a light receiving means which is formed of a plurality of light receiving elements for radiating an optical disc with an optical beam emitted from an objective lens and receiving the light beam reflected from the optical beam, a first differential amplifier for obtaining the difference between a holding output from the first envelope detector and a receiving output signal from the first light receiving element, a second envelope detector for holding a receiving output signal from the other light receiving element of the light receiving means, a second differential amplifier for obtaining the difference between the holding output of the second envelope detector and a light receiving output signal from the second light receiving element, a tracking error signal generator for generating a tracking error signal indicating a relative shift in the radius direction of the objective lens and the optical disc by obtaining the difference between the differential output of the first differential amplifier and the differential output of the second differential amplifier, and a sled error signal generator for generating a sled error signal for relatively shifting the optical head as a whole in the radius direction of the optical disc by obtaining the difference between the light receiving output signal from the first light receiving element of the light receiving means and the light receiving output signal from the other light receiving element of the light receiving means.

Moreover, the present invention also provides an optical head and a reproducing apparatus comprising the optical head transfer circuit.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DESCRIPTION OF THE PREFERRED EMBODIMENT

Figure 5:
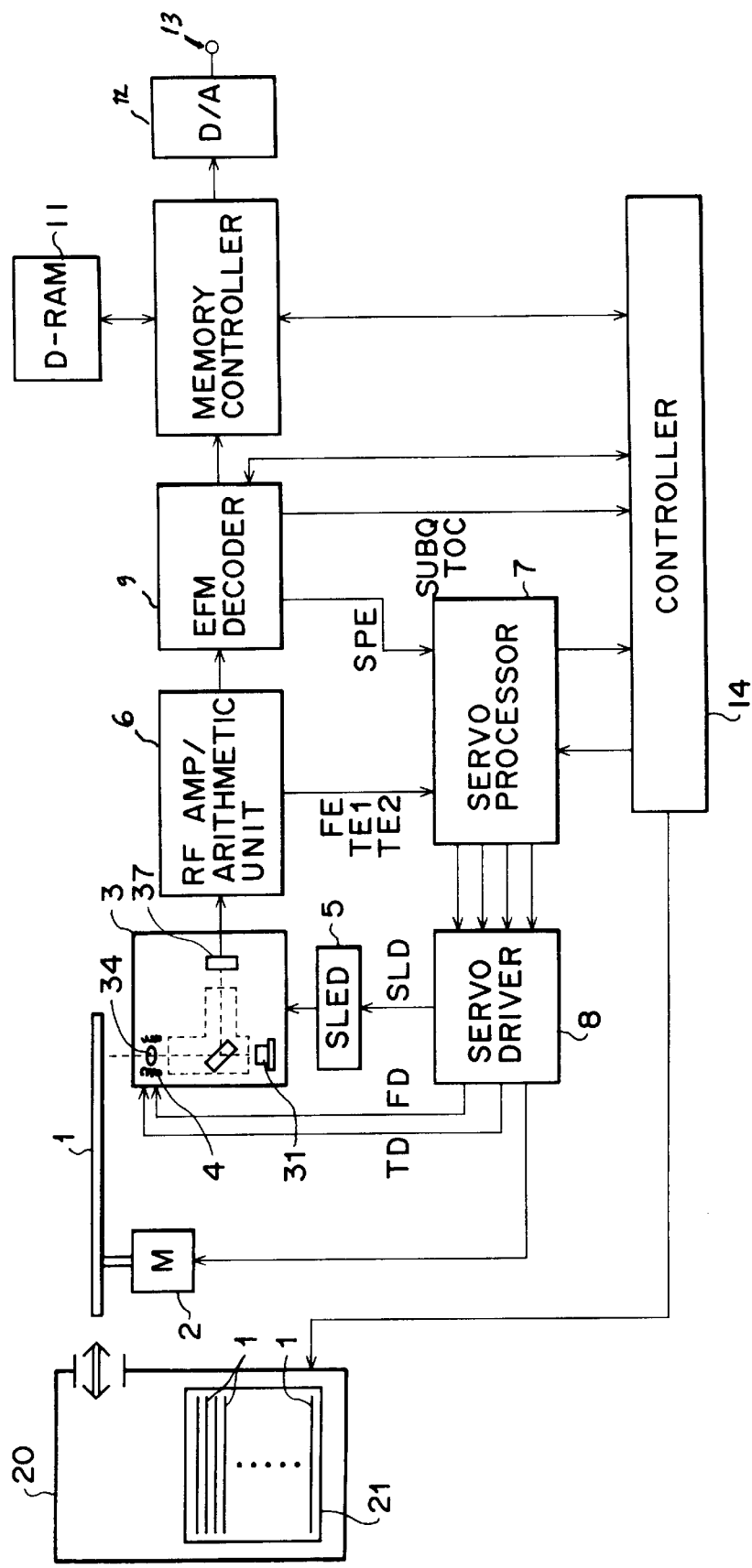
FIG. 5 is a total block diagram of an exchange type disc reproducing apparatus to which the present invention is adopted.

FIG. 5 is a block diagram of a reproducing apparatus for a disc such as a CD provided with a changer function as a preferred embodiment of the present invention.

A disc 1 is driven for rotation by a spindle motor (M) 2. Under this condition, information can be read by means of an optical head 3. The optical head 3 radiates the laser to the disc 1 and the information which is recorded, for example, in the pit condition on the disc 1 can be read from the reflected light beam.

The optical head 3 includes an optical system composed of a laser diode 31 as a laser output means, described below, for reading data from a disc 1, a deflected beam splitter and a ¼ wavelength plate, an objective lens 34 as a laser output end and a photodetector 37 for detecting the reflected light beam, while the objective lens 34 is held to be displaced in both the disc radius direction (tracking direction) and in the direction to become near and far from the disc (focusing direction) by means of a double-axis mechanism 4. Moreover, the optical head 3 as a whole may be moved in the radius direction of the disc 1 by means of a sled mechanism 5.

The information detected by the reproducing operation from the disc 1 with the optical head 3 is supplied to an RF amplifier/arithmetic unit 6. The RF amp/arithmetic unit 6 executes the arithmetic process of the reproduced RF signal, tracking error signals TE1, TE2, and focus error signal FE, etc. from the information supplied.

The tracking error signals TE1, TE2 and focus error signal FE obtained by the RF amp/arithmetic unit 6 are then supplied to a servo processor 7. The servo processor 7 generates, for example, the servo signal as the PWM modulated signal depending on the focus error signal TE and then supplies this servo signal to the servo driver 8. The servo driver 8 generates the focus drive signal FD based on the PWM modulated signal supplied and impresses this signal to a focus coil of the double-axis mechanism 4. Namely, the drive of the objective lens in the focus direction is controlled by the focus error signal FE.

The servo processor 7 generates a servo signal as a PWM modulated signal depending on the tracking error signal TE1 and then supplies this signal to the servo driver 8. The servo driver 8 generates the tracking drive signal TD based on the PWM modulated signal supplied and then impresses this signal to the tracking coil of the double-axis mechanism 4. Namely, the drive of the objective lens in the tracking direction is controlled on the basis of the tracking error signal TE1 in the double-axis mechanism 4.

Moreover, the servo processor 7 generates a sled servo signal as the PWM modulated signal from a low frequency element of the tracking error signal TE2 and then supplies this signal to the servo driver 8. The servo driver 8 generates the sled drive signal SLD based on the PWM modulated signal supplied to drive the sled mechanism 5.

Further, the servo processor 7 generates a spindle servo signal on the basis of the spindle error signal SPE from a decoder 9 and a spindle kick and spindle brake command, etc. from a system controller 14 and then supplies this spindle servo signal to the servo driver 8. The servo driver 8 impresses the spindle drive signal SPD based on the spindle servo signal to a spindle motor 2. Thereby, rotation and stop and the constant linear velocity (CLV) control during rotation of the spindle motor 2 can be executed.

In the reproducing apparatus of this preferred embodiment, the RF amp/arithmetic unit 6 and servo processor 7 are assumed to be integrally constituted with an IC, etc.

Meanwhile, the reproduced RF signal extracted by the RF amp/arithmetic unit 6 is supplied to the decoder 9 and the reproduced RF signal supplied is subjected, in the decoder 9, to the processes such as EFM demodulation (Eight Fourteen Demodulation) and CIRC decoding (Cross Interleaved Reed Solomon Decoding) and thereafter the reproduced RF signal is once stored in a buffer memory 11 under the control of the main controller 10. The digital audio data read from the buffer memory 11 in the predetermined timing is converted to an analog signal by a D/A converter 12, supplied to the predetermined amplifying circuit from a terminal 13 and is then reproduced as an output, for example, as the right and left channel audio signals. The buffer memory 11 is formed, for example, of a D-RAM (Dynamic-Random Access Memory) having the capacity for storing the digital audio data of about four seconds as the reproduced audio signal.

The decoder 9 extracts the subcode information, namely TOC (Table of Contents) and address data, recorded on the disc 1 together with an audio data and then supplies these data to the system controller 14. Moreover, the reproduced clock synchronous to the reproduced data is generated by supplying the EFM signal to a PLL (Phase Locked Loop) circuit and is used for various processes such as decoding. But, since this reproduced clock is synchronous to a disc rotation speed, the reproduced clock is compared with the reference clock generated from the master clock to obtain the spindle error signal SPE as the difference signal. This spindle error signal SPE is then supplied to the servo processor 7.

The system controller 14 is formed of a microcomputer to control various circuits and supply the master clock. In addition to the control explained above, setting or changing of each servo gain can also be done for the servo processor 7.

The disc 1 can be accommodated in a plurality of pieces within a disc magazine 21, a certain disc is selected by a transfer mechanism 20 and it is then loaded to the position where it is reproduced by means of the optical head 3.

Here, the structure of the optical head 3 provided in the reproducing apparatus of the preferred embodiment of present invention will be explained with reference to FIG. 6 to FIG. 9.

Figure 1:
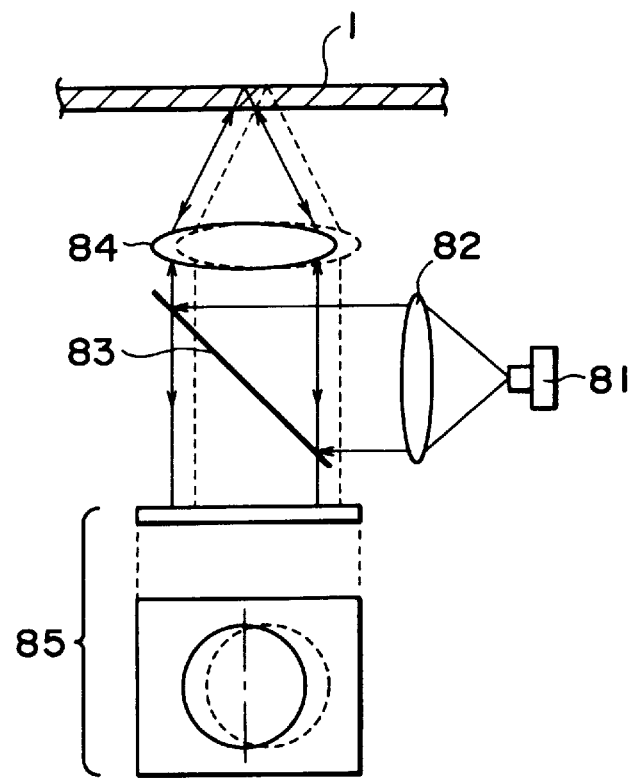
FIG. 1 is a structural diagram of the inside of an optical pickup of the related art.
Figure 2:
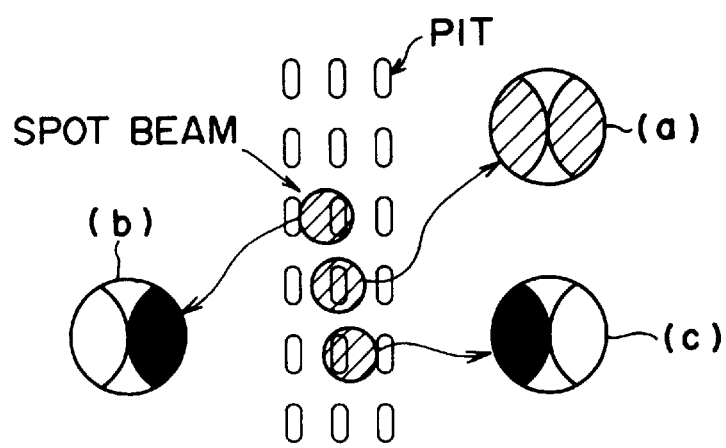
FIG. 2 shows light receiving patterns when the reflected light beam obtained by radiating the light beam to the pit train which is engraved previously on a disc is received on the photo detector of the optical pickup.
Figure 6:
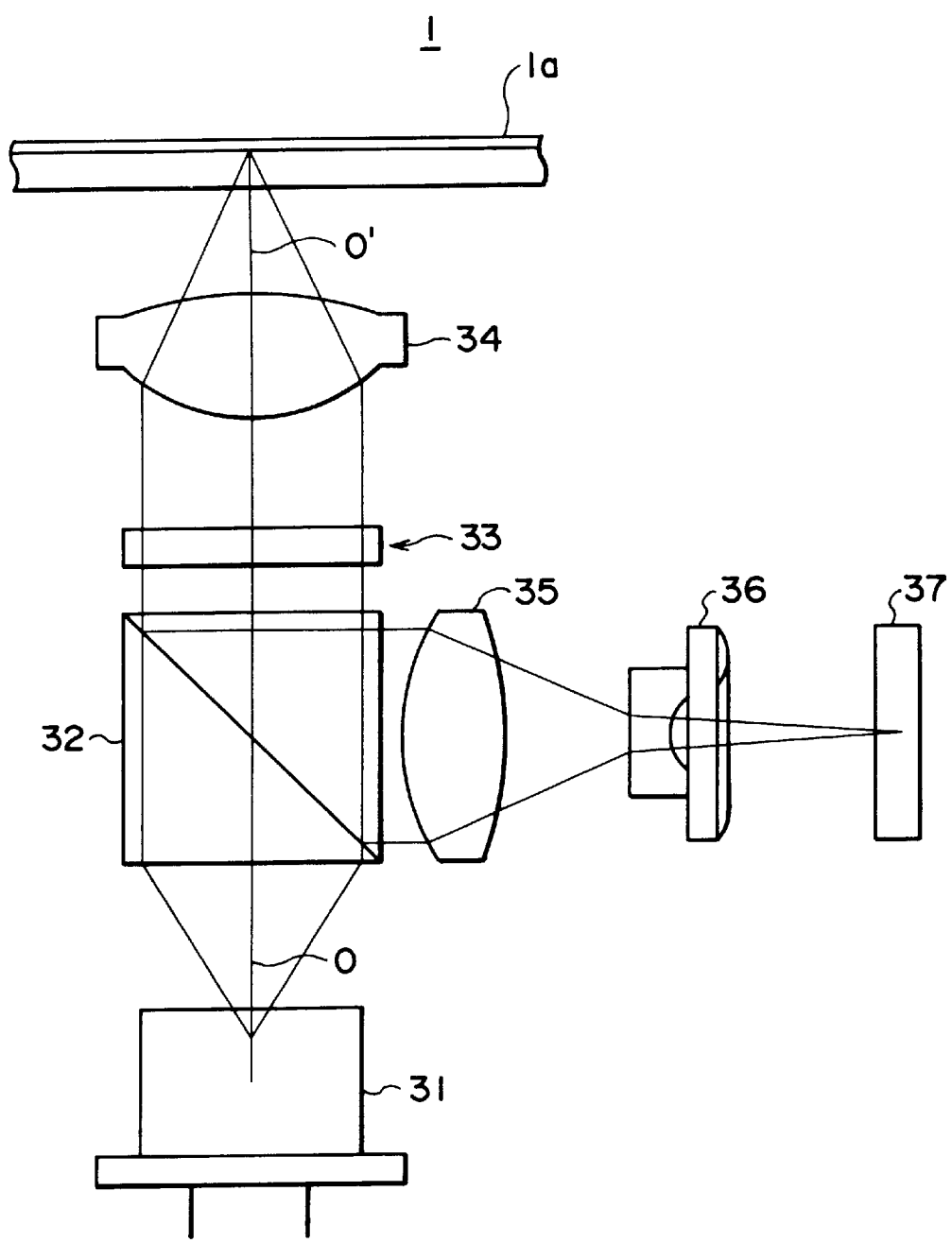
FIG. 6 is a structural diagram of the inside of the optical pickup to which the present invention is adopted.

FIG. 6 is a plan view of the optical head 3 which is composed of a laser source 31, a deflected beam splitter 32, a ½ wavelength plate 33, an objective lens 34, a condensing lens 35, a cylindrical lens 36 and a photodetector 37. The optical head 3 constituted as explained above allows, in comparison with the optical head of the related art shown in FIG. 1, elimination of the collimator lens and therefore the optical head 3 as a whole can be reduced in size.

Figure 7:
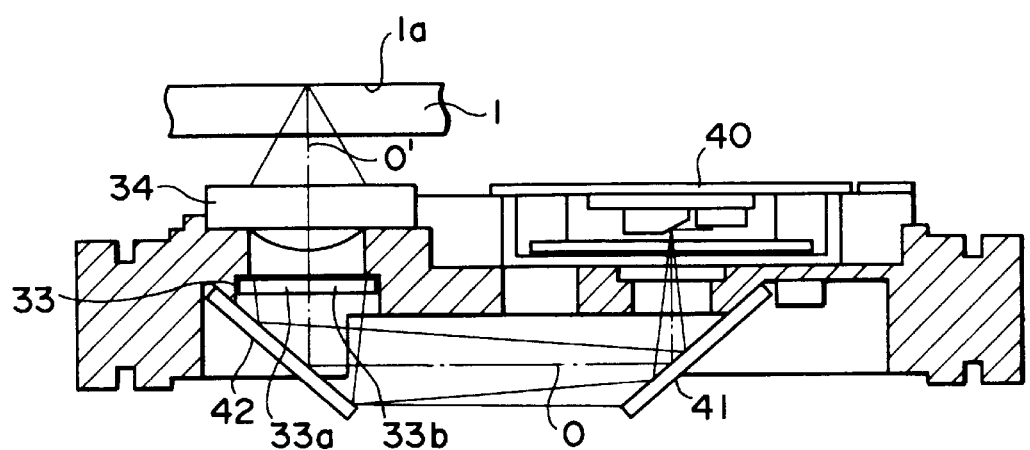
FIG. 7 is a structural diagram of the inside of the optical pickup to which the present invention is adopted.

Next, a practical example of the structure of the optical head 3 will be explained with reference to FIG. 7. In FIG. 7, a laser coupler 40 is composed of the laser source 31, deflected beam splitter 32 and photodetector 37 which are shown in FIG. 6 and mounted on the same silicon substrate, a couple of silicon mirrors 41, 42 for deflecting the light axis O-O' of the light emitted from this laser coupler 40, objective lens 34 which condenses the light reflected from the silicon mirror 42 and then radiates the light beam to the recording surface 1a of the disc 1 and ½ wavelength plate 33 which is disposed between the laser coupler 40 and disc 1 and has the regions 33a, 33b which are divided at least into two regions at the plane orthogonal to the light axis O-O' resulting in different light axes in these regions.

Figure 8:
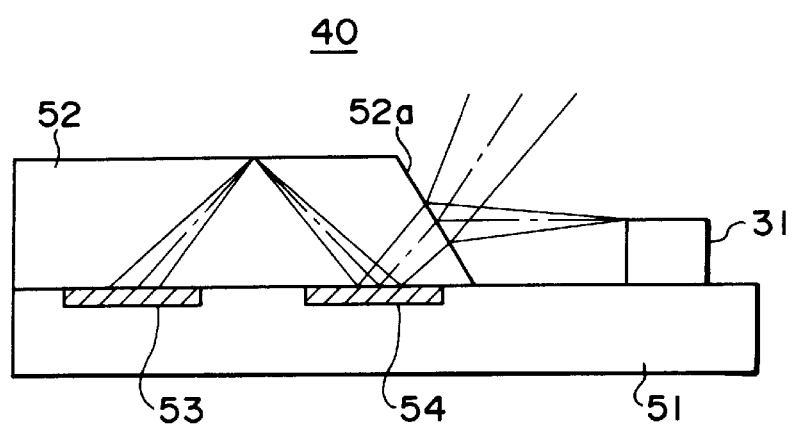
FIG. 8 is a structural diagram of the inside of a laser coupler to which the present invention is applied.

The laser coupler 40 is composed, for example, as shown in FIG. 8, of the laser source 31 provided on the silicon substrate 51, a microprism 52 having a deflection surface disposed along the light axis O-O' between the laser source 31 and objective lens 34 shown in FIG. 7 to isolate the predetermined deflected element of the reflected light beam reflected by the recording surface 1a of the disc 1 and generate the focus error signal FE, and photodetectors 53, 54 for respectively detecting the amount of light at positions an equal distance from the focusing point formed on the silicon substrate 51.

Figure 9:
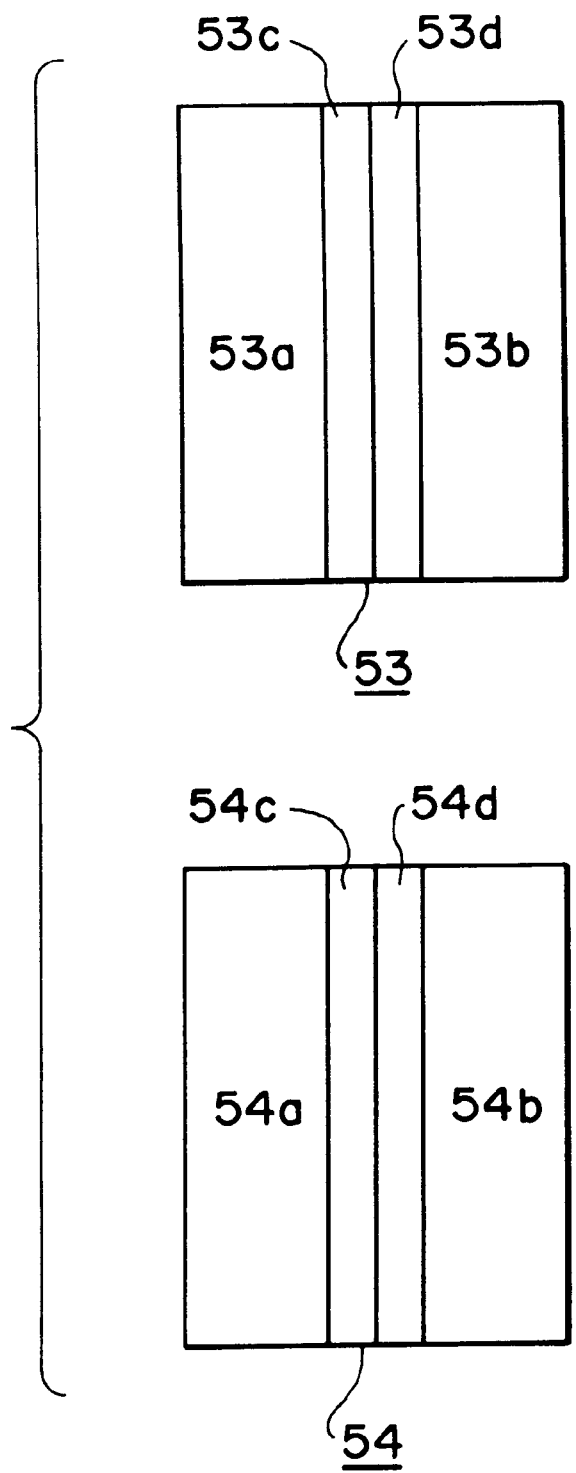
FIG. 9 is a structural diagram of a light receiving element to which the present invention is adopted.

The light receiving regions of the photodetectors 53, 54 are divided respectively into four regions 53a, 53b, 53c, 53d and four regions 54a, 54b, 54c, 54d, for example, as shown in FIG. 9. Therefore, at the plane orthogonally crossing the light axis O-O' of the ½ wavelength plate 33, the light axes at the regions at least divided into two sections, for example, at the regions 33a, 33b, are set at different angles and the reflectivities for the P wave and S wave of the surface 52a of the microprism 52 are respectively set to 0% and 100% so that the reflected light beam having passed the first region 33a of the ½ wavelength plate 33 of the output beam from the laser source 31 and reflected by the recording surface 1a of the disc 1 passes the second region 33b of the ½ wavelength plate 33 and the reflected light beam having passed the second region 33b of the ½ wavelength plate 33 of the output light beam from the laser source 31 and reflected by the recording surface 1a of the disc 1 passes the first region 33a of the ½ wavelength plate 33.

The reflected beams detected respectively in the regions 53a, 53b, 53c, 53d of the photodetector 53 and the regions 54a, 54b, 54c, 54d of the photodetector 54 shown in FIG. 9 are supplied to the RF amp/arithmetic unit 6 and thereby the reproduced RF signal, tracking error signals TE1, TE2 and focus error signal FE, etc. can be extracted.

Figure 10:
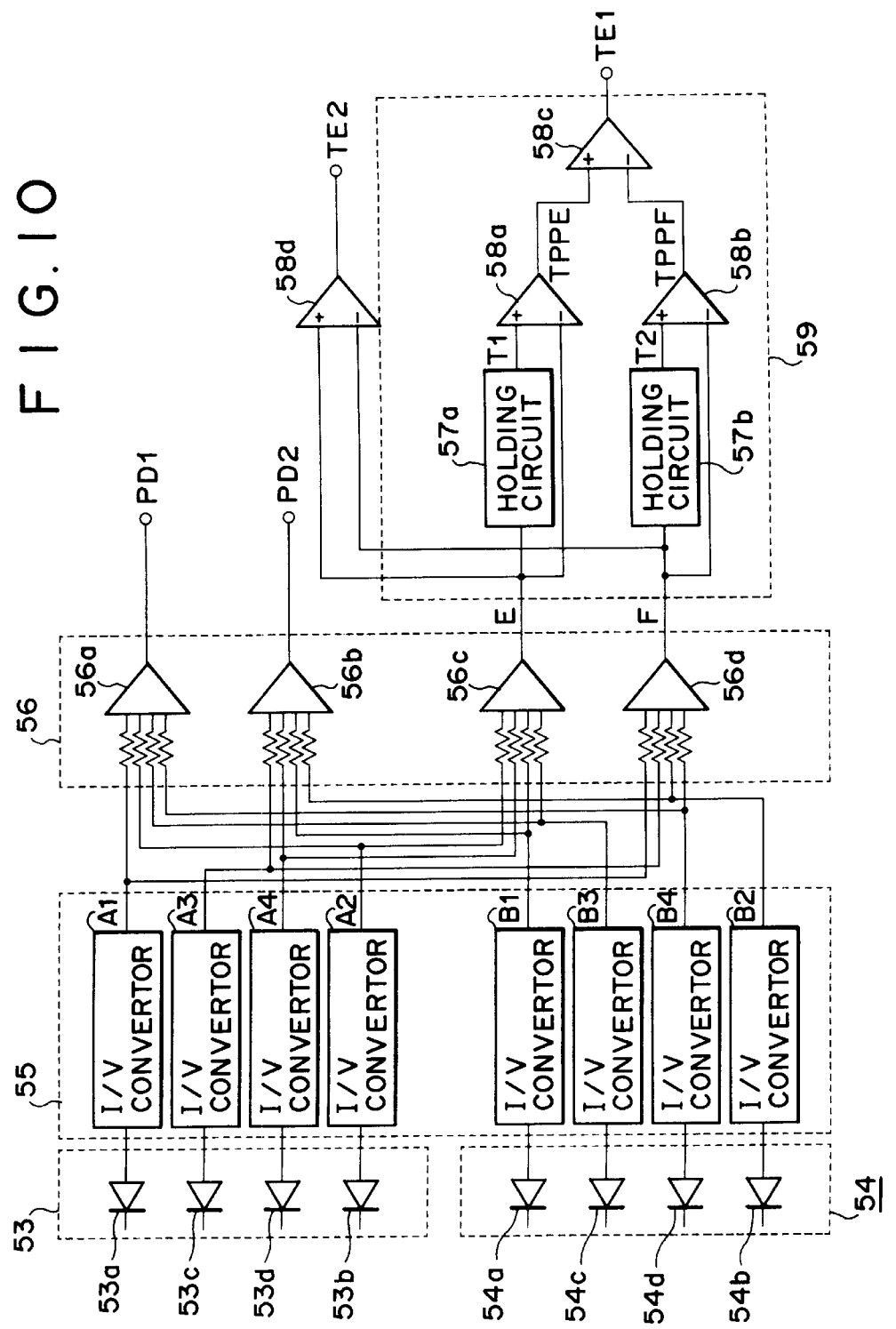
FIG. 10 is a block diagram of a tracking error signal TE1 and sled error signal TE2 generating circuit to which the present invention is adopted.

FIG. 10 shows a practical example of the structure of the tracking control circuit block for controlling the tracking among the circuit structure of the RF amp/arithmetic unit 6 and servo processor 7 formed by an IC. The current signals detected in the regions 53a, 53b, 53c, 53d of the photodetector 53 and in the regions 54a, 54b, 54c, 54d of the photodetector 54 are respectively supplied to the current-voltage converters 55 (hereinafter referred to as "I-V converters") provided in the respective regions. For example, the current signal detected in the region 53a of the photodetector 53 is converted to the voltage signal A1, while the current signal detected in the region 53c is converted to the voltage signal A3, the current signal detected in the region 53d is converted to the voltage signal A4 and the current signal detected in the region 53b is converted to the voltage signal A2, respectively. Moreover, the current signal detected in the region 54a of the photodetector 54 is converted to the voltage signal B1, while the current signal detected in the region 54c is converted to the voltage signal B3, the current signal detected in the region 54d is converted to the voltage signal B4 and the current signal detected in the region 54b is converted to the voltage signal B2, respectively and these are then output.

An addition amplifier 56 is composed of adders 56a, 56b, 56c, 56d. In the adder 56a, the voltage signals A1, A2, B3, B4 converted by the I-V converter 55 are added and then output as the PD1 signal, while in the adder 56b, the voltage signals A3, A4, B1, B2 from the I-V converter 55 are added and then output as the PD2 signal. The reproduced RF signal and focus error signal FE, etc. are generated and then output from the PD1 signal and the PD2 signal. For example, the reproduced RF signal is obtained by adding the PD1 signal and the PD2 signal, while the focus error signal is generated depending on the difference between the PD1 signal and the PD2 signal.

Moreover, the adder 56c outputs a push-pull signal E obtained by adding the voltage signals A2, A4, B1, B3 from the I-V converter 55, while the adder 56d outputs a push-pull signal F by adding the voltage signals A1, A3, B2, B4 from the I-V converter 55. These push-pull signal E and the push-pull signal F are assumed to include the DC offset voltage which is generated when the objective lens 34 of the optical head 3 is shifted in the tracking direction. These push-pull signals E, F are respectively supplied to the holding circuits 57a, 57b. Thereby, the peak voltages are held and the voltage signals T1, T2 obtained by multiplying the peak voltages by predetermined constant (0.8, for example) are then supplied to one end terminals of the amplifiers 58a, 58b.

The voltage signals T1, T2 output from the holding circuits 57a, 57b and the push-pull signals E, F output from the adder amplifiers 56c, 56d are respectively input to the amplifiers 58a, 58b. The amplifier 58a outputs a difference voltage between the voltage signal T1 from the holding circuit 57a and the push-pull error signal E from the adder amplifier 56c and the amplifier 58b outputs a difference voltage between the voltage signal T2 from the holding circuit 57b and the push-pull error signal F from the adder amplifier 56d. As a result, the amplifiers 58a, 58b respectively output the top hold push-pull signals TPPE, TPPF from which the DC offset voltage included in the push-pull error signals E, F is canceled. The TPP circuit of the present invention can be formed of the holding circuits 57a, 57b and amplifiers 58a, 58b, 58c.

The amplifier 58c outputs a difference voltage between the top hold push-pull signals TPPE and TPPF output from the amplifiers 58a, 58b as the tracking error signal TE1.

Therefore, this tracking error signal TE1 is supplied to the double-axis mechanism 4 to control the objective lens 34. Accordingly, if the objective lens 34 is shifted in the horizontal direction (tracking direction), the DC offset voltage may be eliminated depending on the amount of shift and thereby the double-axis mechanism 4 can accurately control the tracking.

Moreover, in this preferred embodiment, the push-pull signal E output from the adder amplifier 56c and the push-pull signal F output from the adder amplifier 56d are supplied to the amplifier 58d and the amplifier 58d outputs a difference voltage as the tracking error signal TE2. A low frequency element (2 Hz to 3 Hz or lower) is extracted, to generate the sled error signal, by means of a low-pass filter not illustrated from the tracking error signal TE2 containing the DC offset voltage.

Therefore, when the sled error signal is supplied to the sled mechanism 5 to control the tracking of the optical head 3 as a whole, the sled mechanism 5 is controlled by the sled error signal to which the DC offset voltage is added depending on the amount of shift even if the arm forming the double-axis mechanism 4 to hold the objective lens 34 is shifted in the tracking direction due to its gravity. Accordingly, the optical head 3 can be returned to the actual mechacenter.

Figure 3A:
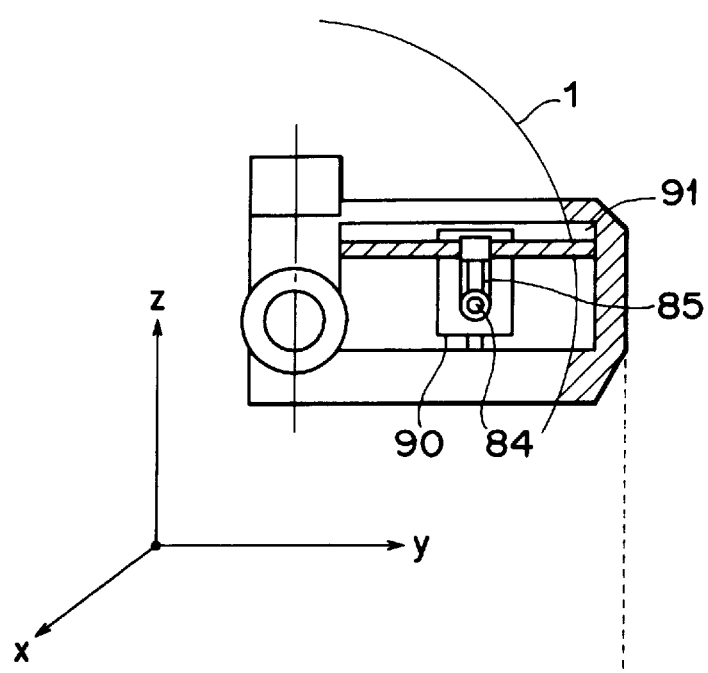
FIG. 3A is a diagram indicating the relationship between a mechanical means for mounting the optical pickup of the reproducing apparatus installed vertically and a disc.
Figure 3B:
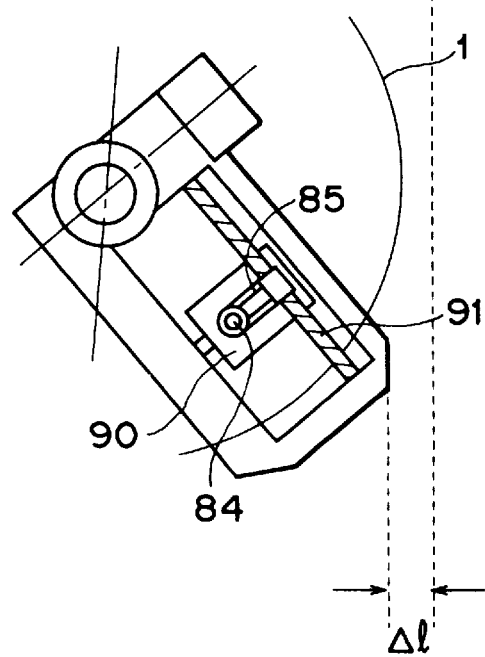
FIG. 3B is a layout indicating the relationship between the mechanical means for mounting an optical pickup and reducing the projected portions in comparison with that of FIG. 3A in the reproducing apparatus installed vertically and a disc.
Figure 4A:
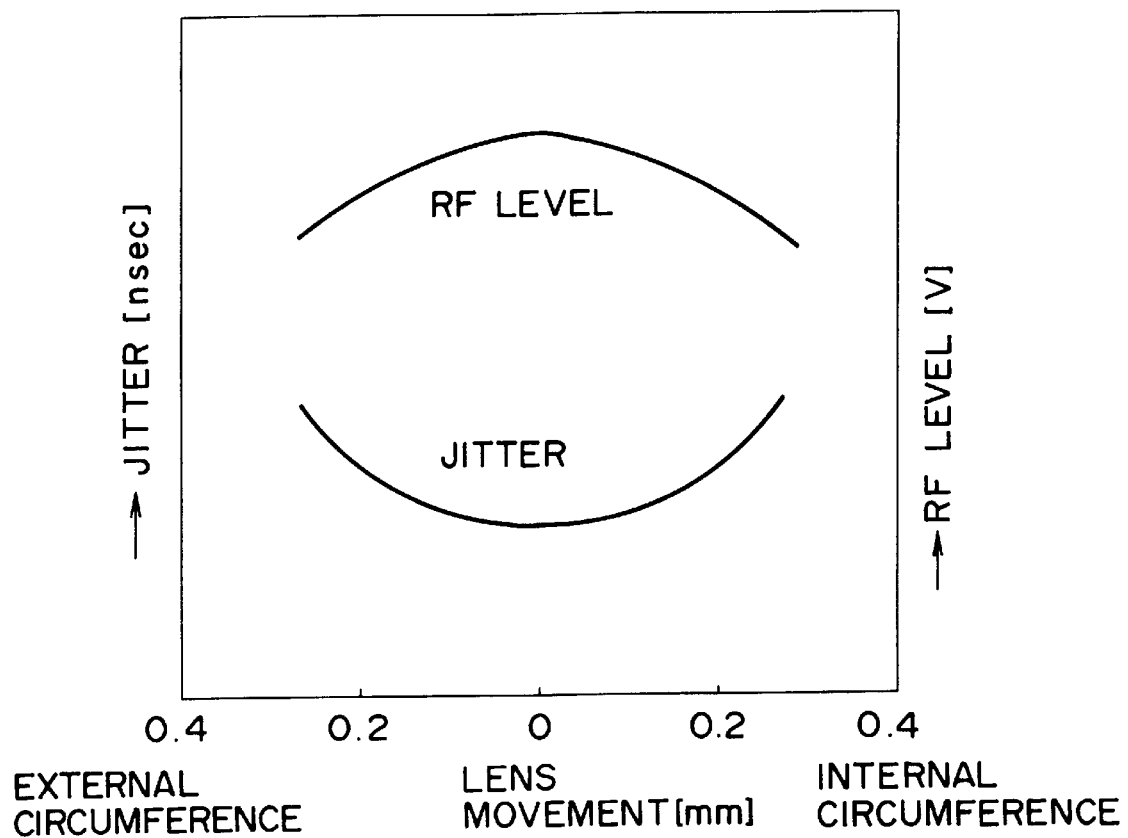
FIG. 4A is a graph showing changes of the reproduced RF signal level and jitter value depending on the movement of the lens.
Figure 4B:
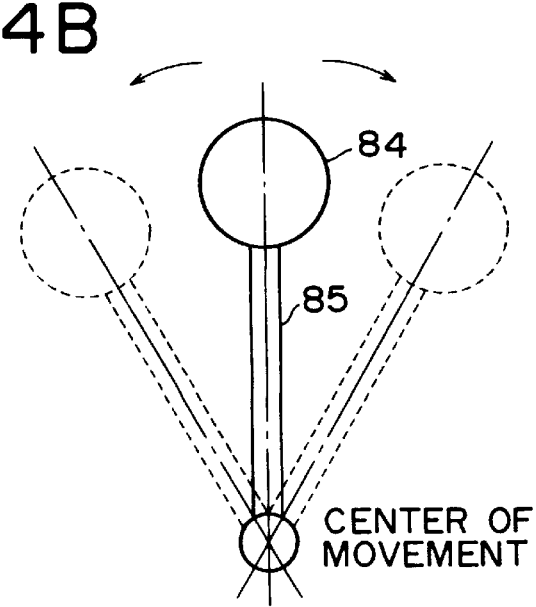
FIG. 4B is a schematic diagram indicating the range of the visual field of the objective lens.
Figure 11:
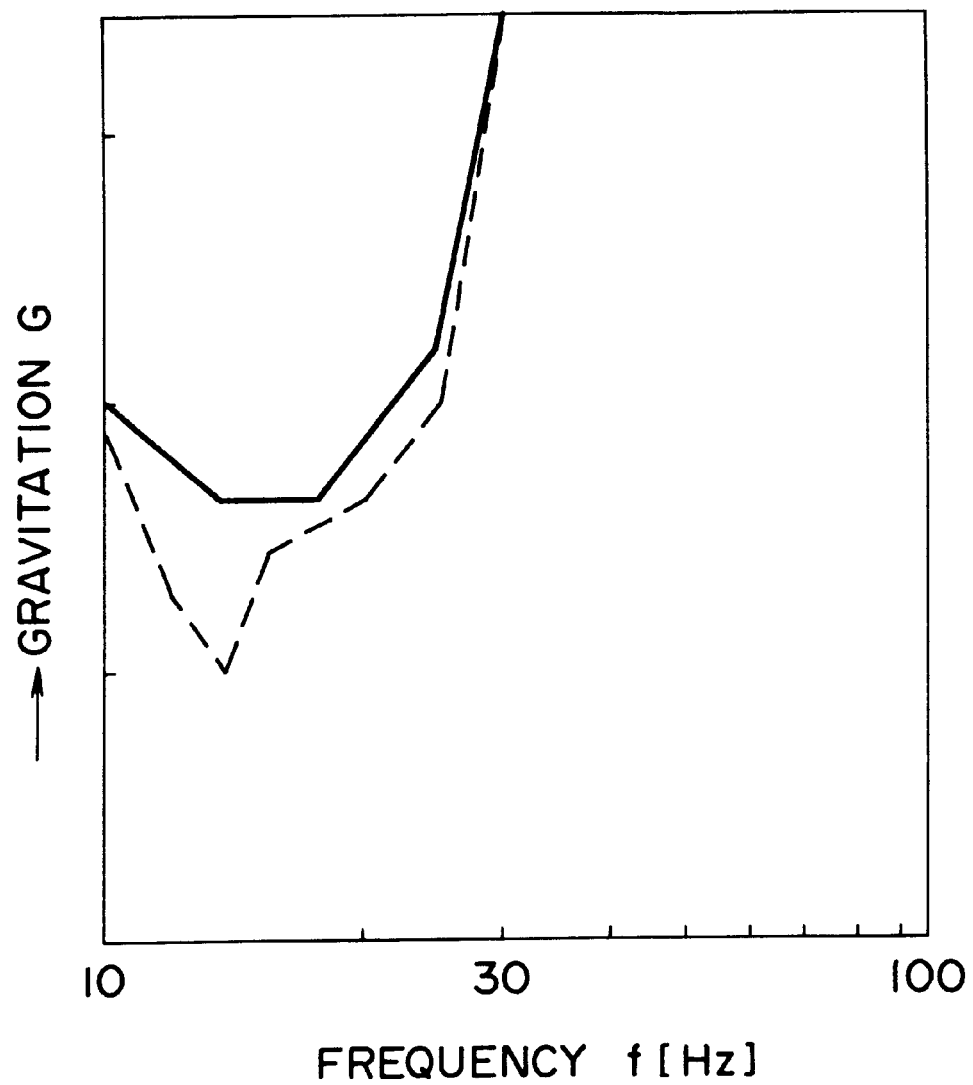
FIG. 11 is a graph showing a result of comparison of the earthquake proof characteristics of the reproducing apparatus to which the optical head transfer circuit of the present invention is adopted and the reproducing apparatus to which the optical head transfer circuit of the related art is adopted.

As a result, a reproducing operation is realized while the visual field is maintained in well improved condition even when the optical head of the reproducing apparatus is disposed with a certain inclination angle as shown in FIG. 3B. The vibration proof characteristic of the related art as indicated by a broken line in FIG. 11 can be improved as indicated by a solid line in FIG. 11. That is, even when the optical head is arranged with a certain inclination angle, the vibration proof characteristic which is almost equal to that obtained when the optical head 3 is arranged in vertical can be obtained. Accordingly, it is now possible to arrange the optical head of the reproducing apparatus with a certain inclination angle, and the reproducing apparatus as a whole can be reduced in size.

As explained previously, the reproducing apparatus of the present invention is provided with a tracking control signal generating means which can generate a first tracking control signal to control displacement of the objective lens and a second tracking control signal to extract the sled control signal to control displacement of the optical head. Here, the first tracking control signal is generated as the signal not including the DC offset voltage corresponding to displacement of the objective lens, while the second tracking control signal as the signal including the DC offset voltage corresponding to displacement of the objective lens. Therefore, deterioration of the vibration proof characteristic can be prevented even if the optical head is disposed with a certain inclination angle. As a result, it is now possible to arrange the optical head with a certain inclination angle and the reproducing apparatus can be reduced in size.

What is claimed is:

1. An optical head transfer circuit, comprising:

first holding means for holding a receiving light output signal from a first photodetecting element of a photodetector formed of a plurality of photodetecting elements, said plurality of photodetecting elements for receiving light reflected from an optical disc, said light being first emitted by a light source and focused to said optical disc via an objective lens;

a first differential amplifier for obtaining a difference between a holding output of said first holding means and the light receiving output signal from said first photodetecting element;

second holding means for holding a light receiving output signal from a second photodetecting element of said photodetector;

a second differential amplifier for obtaining a difference between a holding output from said second holding means and the light receiving output signal from said second photodetecting element;

tracking error signal generating means for generating a tracking error signal which indicates a relative amount of shift in a radius direction of said objective lens and optical disc by obtaining a difference between a differential output of said first differential amplifier and a differential output of said second differential amplifier; and sled error generating means for generating a sled error signal which relatively shifts an optical head as a whole in the radius direction of said optical disc by obtaining a difference between the light receiving output signal from the first photodetecting element of said photodetector and the light receiving output signal from the other photodetecting element of said photodetector, wherein said tracking error signal and said sled error signal are output simultaneously to combine to correct a tracking error.

2. An optical head apparatus, comprising:

a photodetector formed of a plurality of photodetecting elements, said plurality of photodetecting elements for receiving light reflected from an optical disc, said light being first emitted by a light source and focused to said optical disc via an objective lens;

first holding means for holding a light receiving output signal from a first photodetecting element of said photodetector;

a first differential amplifier for obtaining a difference between a holding output from said first holding means and the light receiving output signal from said first photodetecting element;

second holding means for holding the light receiving output signal from a second photodetecting element of said photodetector;

a second differential amplifier for obtaining a difference between a holding output from said second holding means and the light receiving output from said second photodetecting element;

tracking error signal generating means for generating a tracking error signal which indicates a relative shift in a radius direction of said objective lens and optical disc by obtaining a difference between a differential output of said first differential amplifier and a differential output of said second differential amplifier; and sled error signal generating means for generating a sled error signal for relatively shifting an optical bead as a whole in the radius direction of said optical disc by obtaining a difference between the light receiving output signal from the first photodetecting element of said photodetector and the other photodetecting element of said photodetector, wherein said tracking error signal and said sled error signal are output simultaneously to combine to correct a tracking error.

3. A reproducing apparatus, comprising:

a light source;

an objective lens;

a photodetector formed of a plurality of photodetecting elements for receiving light reflected from an optical disc, said light being first emitted by said light source and focused to said optical disc via said objective lens;

first holding means for holding a light receiving output signal from a first photodetecting element of said photodetector;

a first differential amplifier for obtaining a difference between a holding output from said first holding means and the light receiving output signal from said first photodetecting element;

second holding means for holding a light receiving output signal from a second photodetecting element of said photodetector;

a second differential amplifier for obtaining a difference between a holding output from said second holding means and the light receiving output signal from said second photodetecting element;

tracking error signal generating means for generating a tracking error signal which indicates a relative shift in a radius direction of said objective lens and said optical disc by obtaining a difference between a differential output of said first differential amplifier and a differential output of said second differential amplifier;

sled error signal generating means for generating a sled error signal for relatively shifting an optical head as a whole in a radius direction of said optical disc by obtaining a difference between the light receiving output signal from the first photodetecting element of said photodetector and the light receiving output signal from the other photodetecting element of said photodetector;

first driving means for relatively shifting said objective lens in a radius direction of said optical disc depending on the tracking error signal generated by said tracking error signal generating means; and second driving means for relatively shifting said optical head in a radius direction of said optical disc depending on the sled error signal generated by said sled error signal generating means, wherein said tracking error signal and said sled error signal are output simultaneously to combine to correct a tracking error.

4. An optical head transfer circuit, comprising:

a first holding circuit which holds a first receiving light output signal from a first photodetecting element of a photodetector formed of a plurality of photodetecting elements which receive light signals reflected from an optical disc after being focused to said disc from a light source via an objective lens;

a first differential amplifier which outputs a first differential output corresponding to a difference between said first receiving light output signal received from said first holding circuit and a first light signal received from said first photodetecting element;

a second holding circuit which holds a second receiving light output signal from a second photodetecting element;

a second differential amplifier which outputs a second differential output corresponding to a difference between a second output received from said second holding circuit and a second light signal output received from said second photodetecting element;

a third differential amplifier which outputs a third differential output corresponding to a difference between the first differential output and the second differential output received from said first differential amplifier and said second differential amplifier, respectively; and a fourth differential amplifier which outputs a fourth differential output corresponding to a difference between the first light output and the second light output received from the first photodetecting element and the second photodetecting element, respectively, wherein an optical head which includes said light source, said objective lens and said photodetector is shifted in a radius direction of said optical disc based on said fourth differential output of said fourth differential amplifier, and wherein said third differential output and said fourth differential signal are output simultaneously to combine to correct a tracking error.

5. An optical head transfer circuit according to claim 4, wherein said objective lens is shifted in a radius direction of said optical disc based on said third differential output of said third differential amplifier.

6. An optical head apparatus, comprising:

a light source;

an objective lens for focusing light emitted from said light source to a surface of an optical disc;

a photodetector formed of a plurality of photodetecting elements for receiving light signals reflected from said optical disc after being focused to said disc from said light source via said objective lens;

a first holding circuit which holds a first receiving light output signal from a first photodetecting element of said photodetector;

a first differential amplifier which outputs a first differential output corresponding to a difference between said first receiving light output signal received from said first holding circuit and a first light signal received from said first photodetecting element;

a second holding circuit which holds a second receiving light output signal from a second photodetecting element;

a second differential amplifier which outputs a second differential output corresponding to a difference between a second output received from said second holding circuit and a second light signal output received from said second photodetecting element;

a third differential amplifier which outputs a third differential output corresponding to a difference between the first differential output and the second differential output received from said first differential amplifier and said second differential amplifier, respectively; and a fourth differential amplifier which outputs a fourth differential output corresponding to a difference between the first light output and the second light output received from the first photodetecting element and the second photodetecting element, respectively, wherein said optical head is shifted in a radius direction of said optical disc based on said fourth differential output of said fourth differential amplifier, and wherein said third differential output and said fourth differential signal are output simultaneously to combine to correct a tracking error.

7. An optical head apparatus as in claim 6, wherein said objective lens is shifted in a radius direction of said optical disc based on said third differential output of said third differential amplifier.

8. A reproducing apparatus, comprising:

a light source;

an objective lens for focusing light emitted from said light source to a surface of an optical disc;

a photodetector formed of a plurality of photodetecting elements for receiving light signals reflected from said optical disc after being focused to said disc from said light source via said objective lens;

a first holding circuit which holds a first receiving light output signal from a first photodetecting element of said photodetector;

a first differential amplifier which outputs a first differential output corresponding to a difference between said first receiving light output signal received from said first holding circuit and a first light signal received from said first photodetecting element;

a second holding circuit which holds a second receiving light output signal from a second photodetecting element;

a second differential amplifier which outputs a second differential output corresponding to a difference between a second output received from said second holding circuit and a second light signal received from said second photodetecting element;

a third differential amplifier which outputs a third differential output corresponding to a difference between the first differential output and the second differential output received from said first differential amplifier and said second differential amplifier, respectively;

a fourth differential amplifier which outputs a fourth differential output corresponding to a difference between the first light output and the second light output received from the first photodetecting element and the second photodetecting element, respectively;

a sled mechanism for shifting said optical head in a radius direction of said optical disc based on said fourth differential output of said fourth differential amplifier, wherein said third differential output and said fourth differential signal are output simultaneously to combine to correct a tracking error.

9. A reproducing apparatus as in claim 8, further comprising a double-axis mechanism for shifting said objective lens in a radius direction of said optical disc based on said third differential output of said third differential amplifier.

10. A tracking control method for a reproducing apparatus comprising an optical head including a photodetector, an objective lens and a light source, and an optical bead transfer circuit, comprising the steps of:

holding a first receiving light output signal from a first photodetecting element of said photodetector which is formed of a plurality of photodetecting elements which receive light signals reflected from an optical disc after being focused to said disc from a light source via an objective lens;

differentiating said first receiving light output signal and a first light signal received from said first photodetecting element, and outputting a result as a first differentiating output;

holding a second receiving light output signal from a second photodetecting element of said photodetector;

differentiating said second receiving light output signal and a second light signal from said second photodetecting element, and outputting a result as a second differentiating output;

differentiating the first differentiating output and the second differential output, and outputting the result as a third differentiating output;

differentiating the first light signal and the second light signal, and outputting the result as a fourth differentiating signal; and shifting the optical head in a radius direction of an optical disc based on said fourth differentiating output, wherein said third differential output and said fourth differential signal are output simultaneously to combine to correct a tracking error.

11. A tracking control method according to claim 10, further comprising the step of:

shifting the objective lens in a radius direction of said optical disc based on said third differentiating output.

* * * * *